(12) United States Patent
Mozer et al.

(10) Patent No.: US 12,380,228 B2
(45) Date of Patent: *Aug. 5, 2025

(54) SANITIZING PERSONALLY IDENTIFIABLE INFORMATION (PII) IN AUDIO AND VISUAL DATA

(71) Applicant: Sensory, Incorporated, Santa Clara, CA (US)

(72) Inventors: Todd Mozer, Los Altos Hills, CA (US); Pieter Vermeulen, Portland, OR (US); Jonathan Welch, Douglasville, GA (US)

(73) Assignee: SENSORY, INCORPORATED, Santa Clara, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 18/055,291

(22) Filed: Nov. 14, 2022

(65) Prior Publication Data

US 2023/0229790 A1  Jul. 20, 2023

Related U.S. Application Data

(63) Continuation-in-part of application No. 17/579,383, filed on Jan. 19, 2022, now Pat. No. 12,248,603.

(51) Int. Cl.
G06F 21/00 (2013.01)
G06F 21/53 (2013.01)
G06F 21/60 (2013.01)

(52) U.S. Cl.
CPC ............ G06F 21/602 (2013.01); G06F 21/53 (2013.01)

(58) Field of Classification Search
CPC .... G06F 21/602; G06F 21/53; G06F 21/6245; G06F 21/6254
See application file for complete search history.

(56) References Cited

U.S. PATENT DOCUMENTS

| 10,529,336 B1 * | 1/2020 | Matthews | H04M 1/271 |
| 11,039,013 B1 | 6/2021 | Garrod et al. | |
| 11,513,762 B2 * | 11/2022 | Karri | G06V 40/10 |
| 11,748,510 B1 * | 9/2023 | Beveridge | G06F 21/6245 726/27 |
| 2006/0080554 A1 | 4/2006 | McDonald et al. | |

(Continued)

Primary Examiner — Michael M Lee
(74) Attorney, Agent, or Firm — Fountainhead Law Group, PC

(57) ABSTRACT

Techniques for sanitizing personally identifiable information (PII) from audio and visual data are provided. For example, in a scenario where the data comprises an audio signal with speech uttered by a speaker S, these techniques can include removing, obfuscating, or transforming speech related and non-speech related audio cues in the audio signal that can be used to trace the identity of S, while allowing the content of S's speech to remain recognizable. As another example, in a scenario where the data comprises an image or video in which a person P appears, these techniques can include removing, obfuscating, or transforming P's visible biological features and visual indicators of P's location, belongings, or personal data in the image/video, while allowing the general nature of the footage to remain discernable. Through this PII sanitization process, the privacy of individuals portrayed in the audio or visual data can be preserved.

18 Claims, 9 Drawing Sheets

(56) References Cited

U.S. PATENT DOCUMENTS

| | | | |
|---|---|---|---|
| 2012/0310646 A1* | 12/2012 | Hu | G10L 15/02 |
| | | | 704/238 |
| 2014/0274203 A1* | 9/2014 | Ganong, III | G10L 15/02 |
| | | | 455/563 |
| 2014/0280261 A1 | 9/2014 | Butler et al. | |
| 2015/0213288 A1 | 7/2015 | Bilodeau et al. | |
| 2016/0104474 A1 | 4/2016 | Bunn et al. | |
| 2017/0161516 A1 | 6/2017 | Mondal et al. | |
| 2017/0270919 A1 | 9/2017 | Parthasarathi et al. | |
| 2018/0336370 A1 | 11/2018 | Schonwald et al. | |
| 2019/0190890 A1 | 6/2019 | Druker et al. | |
| 2019/0377901 A1 | 12/2019 | Balzer et al. | |
| 2019/0384984 A1 | 12/2019 | Rav-Acha et al. | |
| 2020/0175961 A1* | 6/2020 | Thomson | G10L 15/28 |
| 2020/0258535 A1 | 8/2020 | Vatanparvar et al. | |
| 2020/0285771 A1 | 9/2020 | Dey et al. | |
| 2021/0012026 A1 | 1/2021 | Taylor et al. | |
| 2021/0034585 A1* | 2/2021 | Downs | H04L 63/107 |
| 2021/0073412 A1 | 3/2021 | Kvochko et al. | |
| 2021/0350025 A1 | 11/2021 | Venkataraman et al. | |
| 2022/0084521 A1 | 3/2022 | Arvind et al. | |
| 2022/0129582 A1* | 4/2022 | Lange | G06T 11/00 |
| 2022/0156406 A1 | 5/2022 | Yang | |
| 2022/0207181 A1* | 6/2022 | Ng | A63F 13/35 |
| 2022/0238120 A1* | 7/2022 | Jones | G10L 17/02 |
| 2022/0277565 A1 | 9/2022 | Haro | |
| 2022/0414264 A1 | 12/2022 | Ananthanarayanan et al. | |
| 2023/0057547 A1 | 2/2023 | Shah et al. | |
| 2023/0229803 A1 | 7/2023 | Mozer et al. | |

\* cited by examiner

SANITIZING PERSONALLY IDENTIFIABLE INFORMATION (PII) IN AUDIO AND VISUAL DATA

CROSS-REFERENCES TO RELATED APPLICATIONS

The present application is a continuation-in-part of U.S. patent application Ser. No. 17/579,383 filed Jan. 19, 2022, now U.S. Pat. No. 12,248,603 issued Mar. 11, 2025, entitled "SANITIZING PERSONALLY IDENTIFIABLE INFORMATION (PII) IN AUDIO AND VISUAL DATA," the entire contents of which are incorporated herein by reference for all purposes.

BACKGROUND

Unless otherwise indicated, the subject matter described in this section is not prior art to the claims of the present application and is not admitted as being prior art by inclusion in this section.

In recent years, it has become common for computing devices such as smartphones, smart assistant devices, and the like to capture audio and/or visual data pertaining to the devices' users, surroundings, etc. and provide that data to downstream machine learning (ML) systems (referred to herein as endpoints) for ML model training and inference. In many cases, the captured audio/visual data includes personally identifiable information (PII), which is information that permits the direct or indirect identification of individuals portrayed in the data. For example, a captured image or video can include the face or other identifying visual features of an individual appearing in that footage. Further, a captured audio signal can include speech samples that exhibit acoustic properties indicative of the speaker's vocal tract characteristics.

An issue with the foregoing process is that existing computing devices generally do not remove or obfuscate PII in the audio/visual data they capture before passing the data onward; instead, they pass the data with most or all of the PII intact, even if the ML endpoints operating on that data are "identity-neutral" (i.e., do not rely on PII for correct operation). This can potentially lead to data leaks of the PII on the endpoint side and/or other types of data privacy problems.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details or can be practiced with modifications or equivalents thereof.

1. Overview

Embodiments of the present disclosure are directed to techniques for sanitizing—or in other words, removing, obfuscating, or transforming—PII in audio and visual data, without significantly disrupting the data's non-PII elements. For example, in a scenario where the data comprises an audio signal with speech uttered by a speaker S, these techniques can include removing, obfuscating, or transforming speech related audio cues (e.g., pitch, formants F1, F2, and F3, acoustic characteristics associated with S's vocal tract shape and/or vocal actuators, etc.) and non-speech related audio cues (e.g., environmental sounds, reverberation, etc.) in the audio signal that can be used to trace the identity of S, while allowing the content of S's speech to remain recognizable. As another example, in a scenario where the data comprises an image or video in which a person P appears, these techniques can include removing, obfuscating, or transforming P's visible biological features (e.g., facial features, skin texture/tone, body profile, etc.) and visual indicators of P's location, belongings, or personal data in the image/video, while allowing the general nature of the footage to remain discernable.

Through this sanitization procedure, the techniques of the present disclosure can both protect the privacy of individuals portrayed in the captured audio/visual data and preserve non-PII related information (e.g., statistics, correlations, etc.) within that data, which is useful for various use cases and applications. For instance, in one set of embodiments the sanitized data can be provided as input to an ML endpoint for training or performing inference using one or more identity-neutral ML models. Examples of identity-neutral ML models include speech recognition models, liveness detection models, object/event recognition models, and so on. In these embodiments, the ML endpoint can execute its training and inference tasks without learning anything regarding the identities of the individuals appearing in the audio/visual data, thereby avoiding potential data privacy issues arising out of the endpoint's handling and storage of PII. Further, because the sanitization procedure reduces the degree of diversity in the audio/visual data by removing, obfuscating, or transforming PII, the ML endpoint's models can be smaller in size and/or achieve better accuracy than ML models created using the original unsanitized data.

2. Example Environment and High-Level Solution Design

Figure 1:
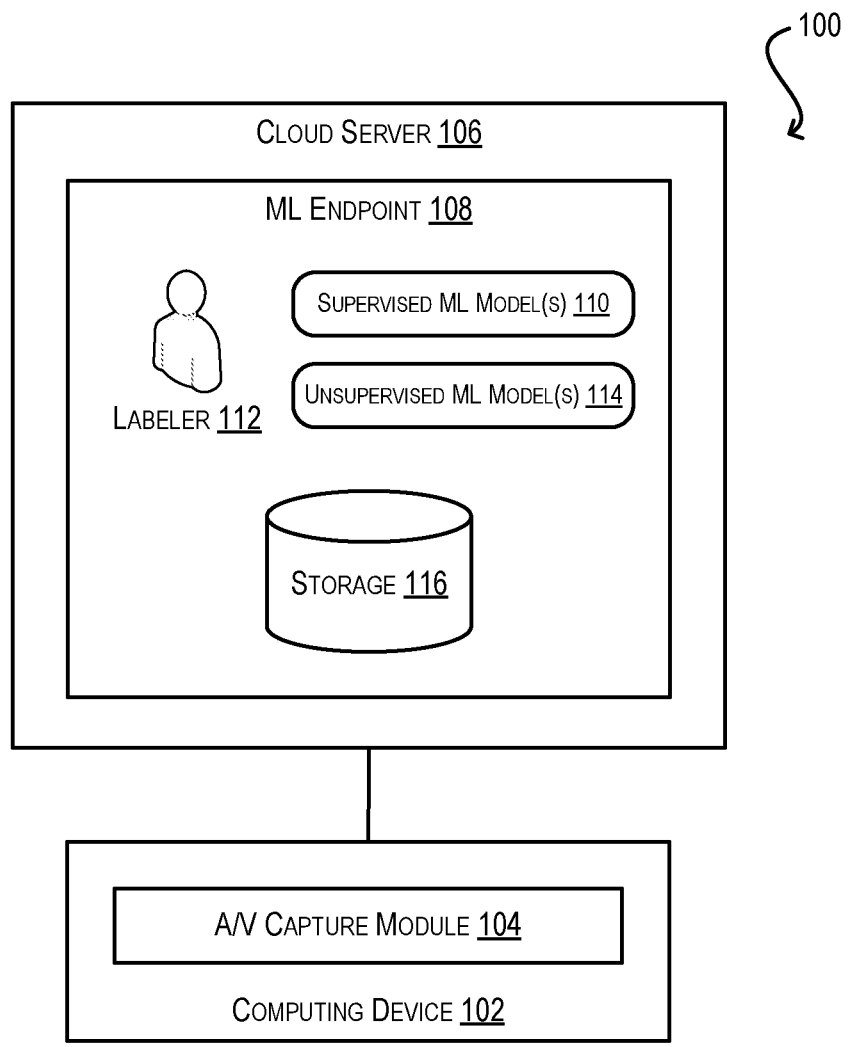
FIG. 1 depicts an example environment.

FIG. 1 depicts an example environment 100 in which embodiments of the present disclosure may be implemented. As shown, environment 100 includes a computing device 102 comprising an audio/visual (A/V) capture module 104 that is communicatively coupled with a remote (i.e., cloud) server 106 comprising an ML endpoint 108. Computing device 102 may be, e.g., a personal computer, a smartphone, a tablet, a smart assistant device, a webcam, an Internet-of-Things (TOT) device, or any other type of computing device or system known in the art. A/V capture module 104 may include one or more microphones, one or more cameras, and/or any other type of hardware that is capable of capturing audio data (e.g., audio signals) and/or visual data (e.g., images or videos) in accordance with the embodiments described herein.

Although A/V capture module 104 is shown in FIG. 1 as being an integral part of computing device 102, in alternative embodiments A/V capture module 104 can be an external component that is coupled with computing device 102 via an appropriate interface (e.g., a wired interface, a wireless interface, etc.). Further, although ML endpoint 108 is shown as running entirely on cloud server 106, in other embodiments some or all of the functionality of ML endpoint 108 may be implemented locally on computing device 102.

In operation, computing device 102 can capture, via A/V capture module 104, audio/visual data pertaining to, e.g., the user(s) of device 102, the device's surroundings, and/or other subjects and can transmit that captured data to ML endpoint 108. In response, ML endpoint 108 can use the audio/visual data for various machine learning tasks. For example, in the case where ML endpoint 108 includes one or more supervised ML models 110, ML endpoint 108 may provide the audio/visual data to a labeler 112 that is tasked with manually inspecting and annotating the data with appropriate labels for training supervised ML model(s) 110. Alternatively or in addition, the audio/visual data may be used to directly train one or more unsupervised ML models 114. Further, if supervised ML model(s) 110 and/or unsupervised ML model(s) 114 have already been trained, the audio/visual data can be provided as input to one or more of the models for inference, resulting in predictions regarding that data. Yet further, the audio/visual data can be written to a storage component 116 of ML endpoint 108 for future training or inference with respect to ML supervised model(s) 110 and/or unsupervised ML model(s) 114.

As noted in the Background section, existing computing devices that collect and provide audio/visual data to ML endpoints like endpoint 108 of FIG. 1 generally do not implement any measures for sanitizing PII that may be present in that data. Instead, they typically provide the audio/visual data to downstream ML endpoints as-is (or after performing some pre-processing on the data that is unrelated to the specific task of PII sanitization). While this approach makes sense if the ML endpoints employ ML models that rely on PII to operate correctly (such as, e.g., biometric identification models), many types of ML endpoints are identity-neutral, which means that their ML models do not care whether PII is present or not in the data. For these types of ML endpoints, it is far preferable from a data privacy standpoint to avoid including any PII in the audio/visual data sent to them, as this reduces the potential for that PII to be leaked or otherwise accessed for unauthorized purposes.

Figure 2:
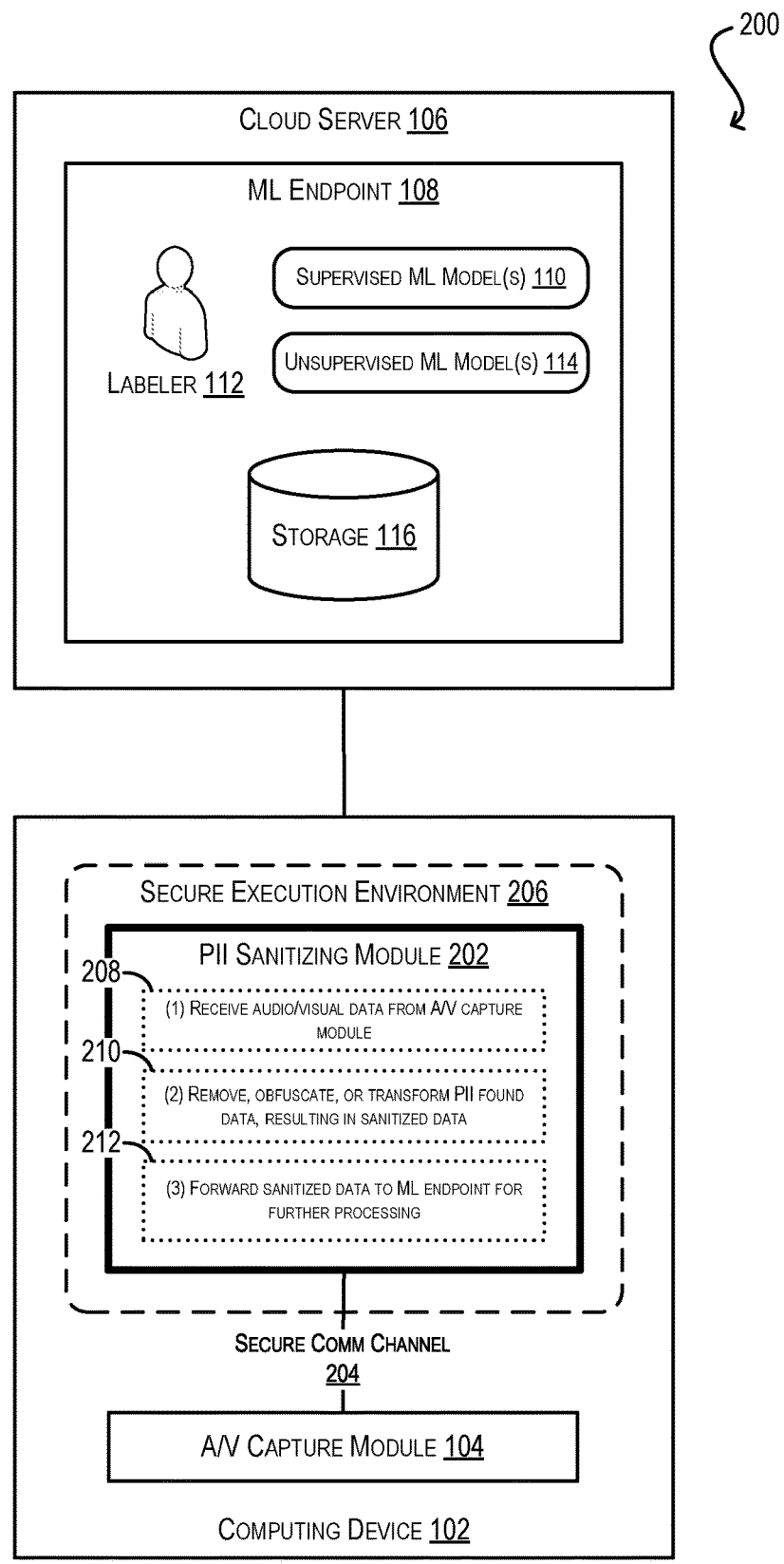
FIG. 2 depicts a version of the environment of FIG. 1 that implements a PII sanitizing module according to certain embodiments.

To address the foregoing and other similar issues, FIG. 2 depicts an enhanced version of environment 100 of FIG. 1 (i.e., environment 200) that includes a novel PII sanitizing module 202 within computing device 102 according to certain embodiments. As shown, PII sanitizing module 202 is coupled with A/V capture module 104 via a secure communication channel 204 and runs within a secure execution environment 206 that cannot be tampered with by attackers and, in some embodiments, does not have any long-term storage capabilities. PII sanitizing module 202 may be implemented in hardware (e.g., as an application-specific integrated circuit (ASIC) or field-programmable gate array (FPGA)), in software, or a combination thereof. In certain embodiments, PII sanitizing module 202 (or a portion thereof) may be implemented as an ultra-low power hardware circuit/chip that consumes a small fraction of the power of more typical microprocessors (e.g., on the order of microwatts or less; these embodiments are described in further detail in section (7) below.

At a high level, PII sanitizing module 202 can receive, over secure communication channel 204, audio and/or visual data captured by A/V capture module 104 (step (1); reference numeral 208) and can remove, obfuscate, or transform PII found in that audio/visual data, resulting in sanitized data that does not reveal anything regarding the identities of individuals appearing in the original audio/visual data (step (2); reference numeral 210). In particular, the sanitization performed at step (2) can strip out PII from the original audio/visual data while preserving other non-PII information (e.g., non-PII related statistics and correlations).

Then, upon completing its sanitization, PII sanitizing module 202 can forward the sanitized data to ML endpoint 108 for further processing (step (3); reference numeral 212). For example, upon receiving the sanitized data, labeler 112 of ML endpoint 108 can inspect and annotate the data with labels for training or re-training supervised ML model(s) 110. As another example, the sanitized data can be applied to directly train or re-train unsupervised ML model(s) 114 without labeling. As yet another example, the sanitized data can be provided as query inputs to supervised ML model(s) 110 and/or unsupervised ML model(s) 114 for inference processing (i.e., prediction generation).

Significantly, because the data stream forwarded by module 202 has been sanitized of all PII, ML endpoint 108 will not be able to learn anything regarding the individuals that appear in the original audio/visual data captured by computing device 102, thereby preserving the privacy of those individuals and minimizing the risk that the PII will leaked or compromised. In addition, because the sanitization performed by module 202 homogenizes (or in other words, reduces the diversity of) the original audio/visual data to an extent, the ML models built by ML endpoint 108 using the sanitized data will generally be smaller in size and/or more performant than ML models created using the original unsanitized data.

Further, because PII sanitizing module 202 runs within a secure execution environment, the raw A/V data that it sanitizes cannot be accessed by unauthorized parties (e.g., attackers). As mentioned above, in some embodiments PII sanitizing module 202 may not include any long-term storage capabilities in order to minimize the risk of PII data leakage. In other embodiments, module 202 may include long-term storage capabilities in order to, for example, carry out user-specific PII removal techniques, but those storage capabilities may be secured via the security mechanisms of secure execution environment 206.

The remaining sections of this disclosure provide additional details regarding possible implementations of PII sanitizing module 202, including: (1) sanitization workflows that can be performed by module 202 on audio data and visual data respectively, (2) a multi-stage PII sanitization architecture in which the functionality of module 202 is split into multiple sub-modules/stages, (3) additional data pre-processing steps that can be performed by module 202 on audio/visual data detected or captured via A/V capture module 104, and (4) an ultra-low power hardware implementation of module 202. It should be appreciated that FIG. 2 is illustrative and not intended to limit embodiments of the present disclosure. For example, although PII sanitizing module 202 is shown as residing on computing device 102, in other embodiments (such as the multi-stage embodiments noted above) some or all of the functionality of module 202 may be implemented at other locations, such as another device at the premises of the device owner or a secured, front-end cloud server that sits between computing device 102 and cloud server 106. Further, in some embodiments PII sanitization module 202 (or portions thereof) may be integrated into the hardware or software of A/V capture module 104, such as within the silicon of a microphone or camera. Yet further, computing device 102 may include other components or subsystems not specifically shown that can supplement or enhance the operation of PII sanitization module 202 (e.g., an encryption chip for encrypting data output by module 202, a neural-net hardware accelerator to accelerate the sanitization operations performed by module 202, and so on).

3. Sanitizing PII in Visual Data

Figure 3:
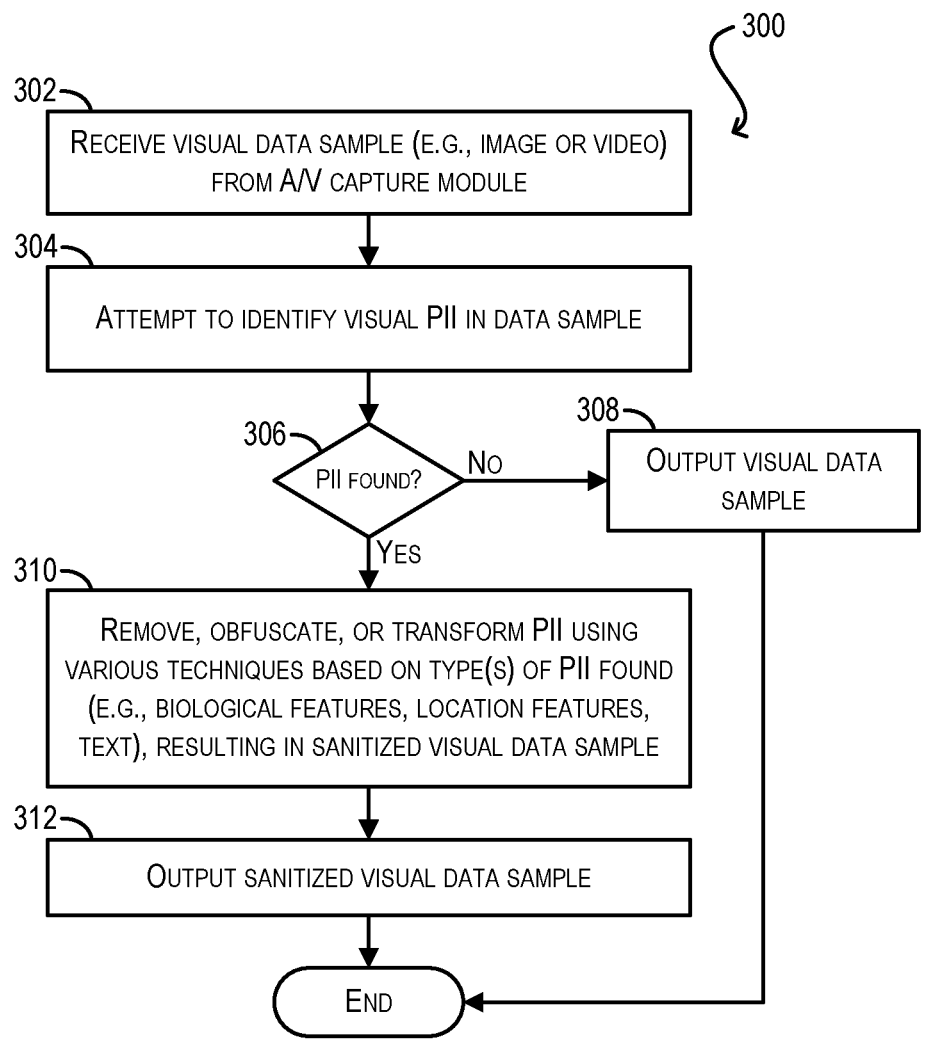
FIG. 3 depicts a flowchart for sanitizing PII from visual data according to certain embodiments.

FIG. 3 depicts a flowchart 300 that may be executed by PII sanitizing module 202 of FIG. 2 for sanitizing PII in visual data received from A/V capture module 104 according to certain embodiments.

Starting with steps 302 and 304, PII sanitizing module 202 can receive a visual data sample (e.g., an image or video) and attempt to identify visual PII in that sample. In one set of embodiments, the identification performed at step 304 can involve using an ML model (e.g., neural network, decision tree, support vector machine, etc.) that reads pixel values of the visual data sample and outputs region proposals (e.g., bounding boxes or segmentation maps) indicating regions in the visual data sample that are likely to contain visual PII of a given type. For example, for a region R1 with pixel values that the ML model has determined are indicative of eyes, nose, and/or mouth features, the ML model may output a region proposal indicating that R1 is likely to contain a face belonging to a person or a depiction of a person. And for a region R2 with pixel values that the ML model has determined are indicative of a street sign or some other location indicator, the ML model may output a region proposal indicating that R2 is likely to contain that street sign/location indicator.

In addition to (or in lieu of) the ML model above, the identification performed at step 304 can involve using optical character recognition (OCR) to recognize sequences of numbers, letters, and/or symbols in the visual data sample. These numbers, letters, or symbols can then be processed via a sequence template matching system or language model to identify text sequences or phrases which are known to constitute, or be revealing of, PII. For example, in the case where a sequence of numbers matching a template of the form ###-###-#### is found, PII sanitizing module 202 can conclude that this sequence likely represents a phone number or social security number. Further, in the case where a sequence of characters and symbols matching the template *@*.* is found, PII sanitizing module 202 can conclude that this sequence likely represents an email address.

At step 306, PII sanitizing module 202 can check whether any visual PII was found in the visual data sample per the identification performed at block 304. If the answer is no, PII sanitizing module 202 can output the visual data sample without modifications (step 308) and flowchart 300 can end.

However, if the answer at step 306 is yes, PII sanitizing module 202 can sanitize (i.e., remove, obfuscate, or transform) the identified PII, thereby converting the visual data sample into a sanitized form (step 310). The specific manner in which PII sanitizing module 202 performs this sanitization can differ based on the types of visual PII found. For example, for PII constituting biological features (e.g., a face), PII sanitizing module 202 can obfuscate the biological features by, e.g., blurring the features while retaining their general shape and position, or replacing the features with a random pattern, a generic placeholder (e.g., a face icon), or a constant color value. Alternatively, PII sanitizing module 202 can use a generative ML model to transform the biological features into those of an entirely different person (e.g., a random or a default person), or replace the entire data sample with one or more embedding vectors (i.e., low-dimensional representations) of the biological features via an ML model that has been trained to construct such embedding vectors in an identity-neutral manner.

For PII constituting location features such as street signs, geographic landmarks, house numbers, and the like, PII sanitizing module 202 can use a semantic segmentation model to retain the features of interest in the foreground of the visual data sample (e.g., people and/or objects) while replacing all other pixels with a constant "green screen" value (or some other value), thereby removing location features that may appear in the sample's background. Alternatively, PII sanitizing module 202 can use a generative model to retain the features of interest in the foreground and replace all other pixels with some neutral/synthetic environment, thereby transforming the background location depicted in the original sample into a completely different location.

And for PII constituting text, PII sanitizing module 202 can obfuscate the text by either blurring/censoring the text or replacing it with a generic template representative of the type of information the text was meant to convey (e.g., 555-555-5555 in the case of a phone number).

Finally, upon completing the sanitization at step 310, PII sanitizing module 202 can output the sanitized version of the visual data sample (step 312) and flowchart 300 can end.

4. Sanitizing PII in Audio Data with Speech

4.1 Sanitization Via Extraction of Standard Speech Features

Figure 4:
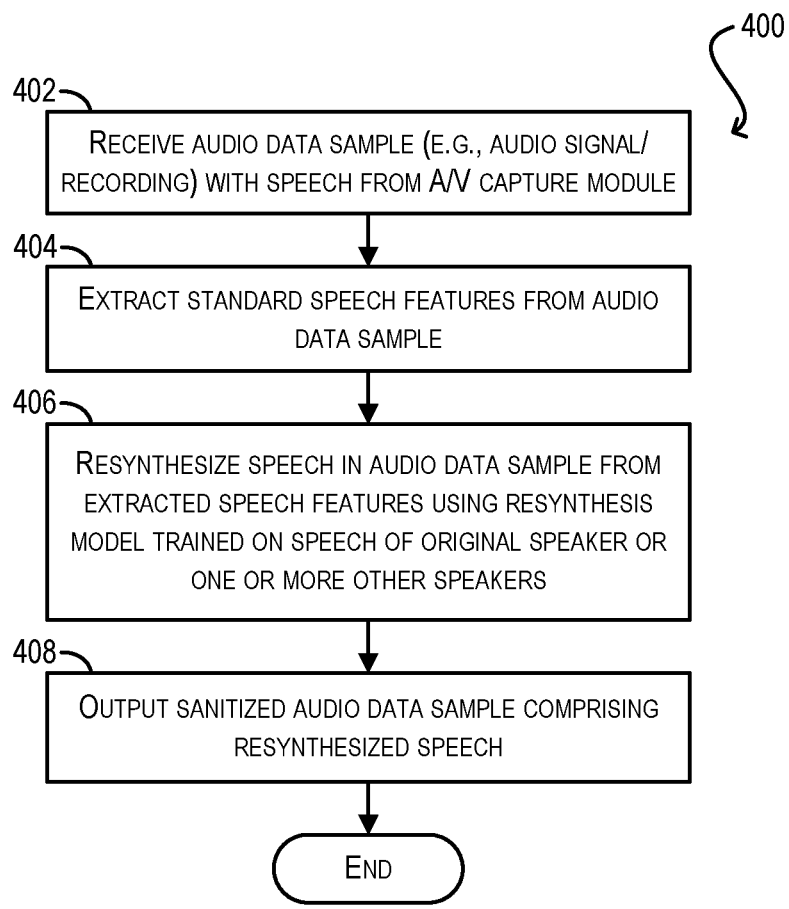
FIGS. 4 and 5 depict flowcharts for sanitizing PII from audio data comprising speech according to certain embodiments.

FIG. 4 depicts a flowchart 400 of a first approach that may be implemented by PII sanitizing module 202 of FIG. 2 for sanitizing PII in audio data comprising speech that is received from A/V capture module 104 according to certain embodiments. This first approach involves extracting standard speech features from the speech, which will typically remove most types of significant PII (e.g., pitch). These standard speech features can be understood as parametric representations of the speech waveform that reduce its data rate while allowing for processing and analysis by a computer.

Note that while the extracted speech features can be used directly for ML inference, the removed PII components should be re-inserted in some form for labeling because a human labeler must be able to listen to and recognize the speech in order to label it. Accordingly, flowchart 400 also includes steps for resynthesizing the original speech from the extracted features. This permits the labeler to listen to and transcribe the resynthesized speech for ML model training purposes. Generally speaking, the speech resynthesis process will remove enough PII to make the speaker of the original speech unidentifiable to humans.

Starting with steps 402 and 404 of flowchart 400, PII sanitizing module 202 can receive an audio data sample (e.g., an audio signal/recording) that includes speech and can extract standard speech features from the speech using one or more known methods. Examples of these standard speech features include filterbank energies, mel-scaled cepstral coefficients, and perceptual linear prediction features. As noted above, the extraction of these features will generally remove significant PII from the audio data sample without negatively affecting speech recognition accuracy. In some embodiments, the parameters used by PII sanitization module 202 to perform this feature extraction step (such as, e.g., frame rate or number of coefficients, etc.) can be configurable.

At step 406, PII sanitizing module 202 can resynthesize the speech in the original audio data sample from the extracted features via an ML resynthesis model that is trained on the speech of the original speaker or one or more other speakers (e.g., random speakers or a default speaker). In other words, the resynthesis model is trained by receiving speech features as input and learning to output speech fragments uttered the by the original speaker or the one or more other speakers that correspond to the input speech features. As mentioned previously, performing this resynthesis from the extracted speech features will likely remove enough PII to make the original speaker of the speech unidentifiable to humans (although the original speaker may be identifiable by computer-based speaker identification systems that have access to reference recordings of the original speaker).

Finally, at block 408, PII sanitizing module 202 can output a sanitized audio sample comprising the resynthesized speech and flowchart 400 can end.

4.2 Sanitization Via Speech Remapping

Figure 5:
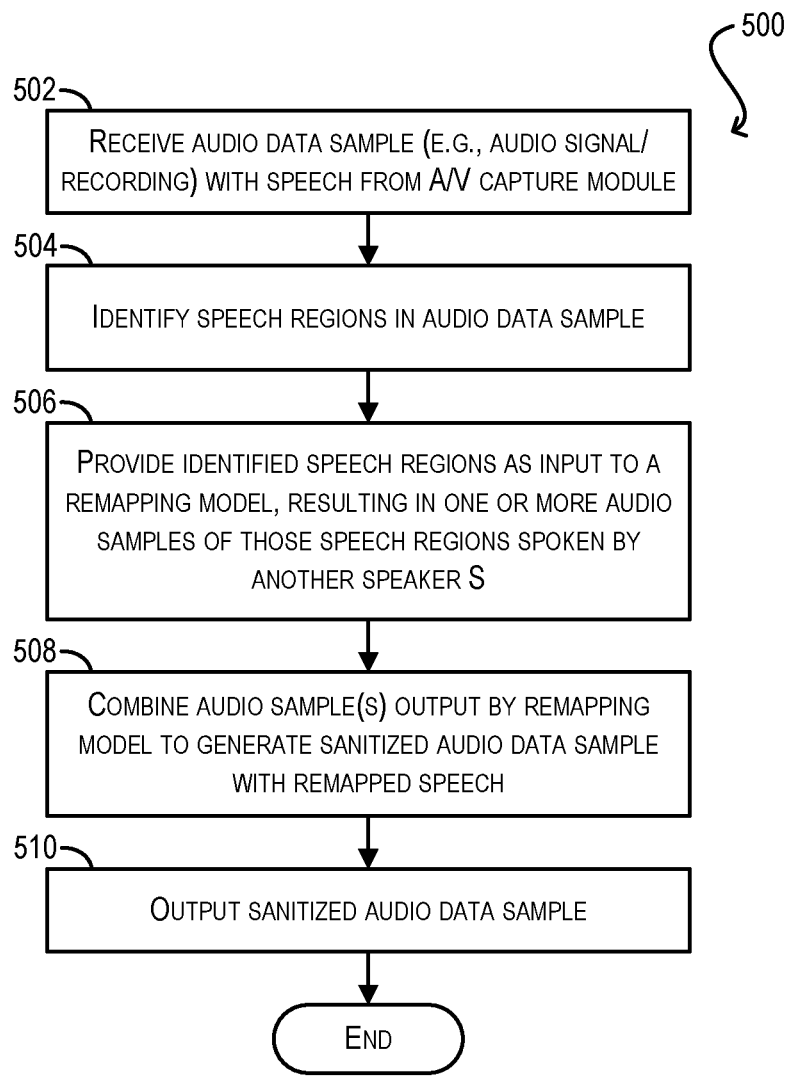

FIG. 5 depicts a flowchart 500 of a second approach that may be implemented by PII sanitizing module 202 for sanitizing PII from audio data comprising speech that is received from A/V capture module 104 according to certain embodiments. This second approach involves using an ML remapping model to directly remap the speech included in the audio data sample to the speech of one or more other speakers (e.g., random speakers or a default speaker), without performing speech feature extraction.

In the case where the remapping model is designed to remap speech to a specific/default speaker, the remapping model can be trained by receiving training data from many different speakers speaking certain sentences or words and training the model to output the same sentences/words as spoken by that specific/default speaker. Upon completing this training, the remapping model will remap the speech of any speaker to sound like the specific/default speaker.

In the case where the remapping model is designed to remap speech to some random speaker target, the remapping model can be trained by receiving training data from many different speakers speaking certain sentences or words and training the model to output the same sentences/words as spoken by any one of a number of random speakers. Upon completing this training, the remapping model will remap the speech of any speaker to sound like some other random speaker.

Starting with block 502, PII sanitizing module 202 can receive an audio data sample comprising speech from A/V capture module 104.

At blocks 504 and 506, PIT sanitizing module 202 can identify (using, e.g., a voice activity detector (VAD)) speech regions in the audio data sample and can provide the identified speech regions as input to the remapping model, resulting in one or more audio samples of those speech regions as spoken by another speaker S. As mentioned above, speaker S may be a specific/default speaker or a randomly chosen speaker.

At block 508, PII sanitizing module 202 can combine the one or more audio samples output by the remapping model and generate a new, sanitized audio data sample with this remapped speech. Finally, PIT sanitizing module 202 can output the sanitized audio data sample (block 510) and flowchart 500 can end.

4.3 Hybrid Approach

In certain embodiments, the approaches of FIGS. 4 and 5 can be combined into a hybrid approach whereby (1) standard speech features are first extracted from the audio data sample received from A/V capture module 104 (in order to remove most PII), and (2) those extracted speech features are subsequently remapped to standard speech features extracted from the speech of another speaker S (either a specific/default speaker or a random speaker). This hybrid approach has the effect of removing any remaining PII that may still be present in the speech features extracted from the original audio data sample.

Because the output of the hybrid approach is a set of sanitized speech features (rather than sanitized speech) corresponding to some different speaker S, speech resynthesis is needed in order to allow a human labeler to listen to and label that output. This resynthesis can be performed in a manner similar to step 406 of flowchart 400 (i.e., via an ML resynthesis model). Note that resynthesizing speech from the sanitized speech features output by the hybrid approach (rather than from the features extracted via the approach shown in FIG. 4) has the advantage of preventing computer-based speaker identification systems from identifying the original speaker using the resynthesized speech.

4.4 Sanitizing Non-speech PII

In addition to sanitizing speech in accordance with the approaches of FIGS. 4 and 5, in some embodiments PIT sanitizing module 202 can also sanitize non-speech PIT that may be present in the audio data sample. As used herein, "non-speech PIT" is auditory PIT that appears in portions of an audio signal that are not specifically speech. Examples of non-speech PIT include environmental sounds that may indicate the audio signal was captured at a particular location or type of location, reverberation characteristics that indicate the type of room or environment of the capture location, acoustic properties of the specific microphone or device that captured the audio signal, and so on.

In one set of embodiments, PIT sanitizing module 202 can employ algorithms that are specifically designed identify non-speech PII in a received audio data sample (as opposed to non-speech sounds or properties that are not personally identifiable, such as generic background noise) and to remove that non-speech PII accordingly. In other embodiments, PIT sanitizing model 202 can employ existing algorithms that are generally designed to reduce or eliminate any acoustic elements in the audio data sample that cannot be identified as speech, which will also have the effect of reducing or eliminating non-speech PIT.

4.5 Identifying and Potentially Sanitizing Spoken PII

In certain embodiments, PII sanitizing module 202 can implement known speech recognition techniques to recognize the content of the speech included in the audio data sample received from A/V capture module 104 and to identify any speech content that may be considered PIT, referred to herein as "spoken PIT." This can be accomplished by, e.g., converting the speech to text and identifying PIT in the text such as names, phone numbers, etc. If such spoken PIT is found, PII sanitizing module 202 can take one or more mitigating actions.

For example, according a first approach, PII sanitizing module 202 can automatically sanitize the spoken PIT from the audio data sample and forward the sanitized version of the sample to ML endpoint 108.

According to a second approach, PII sanitizing module 202 can automatically disqualify the audio data sample as a whole from being an appropriate data sample for ML training/inference and refrain from sending it to ML endpoint 108.

And according to a third approach, PIT sanitizing module 202 can generate a warning for the user of computing device 102 indicating that the audio data sample contains spoken PII (along with an indication of what that spoken PII is) and can provide a choice to the user to either: (1) forward the sample as-is (i.e., with the spoken PII intact) to ML endpoint 108, (2) sanitize the spoken PII in the sample before forwarding it to ML endpoint 108, or (3) "drop" the sample, such that it is not forwarded to ML endpoint 108. This approach can be useful in scenarios where the user intends to convey certain types of spoken PII for ML training/inference purposes, or where PII sanitizing module 202 may have gaps in its ability to accurately detect spoken PII (for example, module 202 may detect a stream of random digits as a phone number). Accordingly, the user is given the agency to select the appropriate action to be taken by PII sanitization module 202 based on what is detected by the module.

5. Data Pre-processing

Beyond sanitization of PII, in some embodiments PII sanitizing module 202 can also implement one or more data pre-processing steps on the audio/visual data received from A/V capture module 104 that improve the overall accuracy and/or efficiency of module 202. For example, in one set of embodiments PII sanitization module 202 can apply denoising algorithms on the audio/visual data prior to implementing the sanitization workflows shown in FIGS. 3-5, which can improve the signal-to-noise ratio in that data. In another set of embodiments, if A/V capture module 104 includes multiple microphones or an additional audio input that corresponds to the current audio output of computing device 102, PII sanitizing module 202 can implement beamforming or echo cancellation. In another set of embodiments, PII sanitizing module 202 can apply data compression techniques (such as, e.g., audio waveform compression) to compress the audio/video data and thereby reduce the amount of memory and/or compute power needed for sanitization.

In yet another set of embodiments, PII sanitizing module 202 can implement an activation mechanism that listens or looks for a trigger condition in the audio/visual data received from A/V capture module 104 before initiating its sanitization processing. In the case of audio data, this trigger condition can be a spoken wake word or set of wake words, and or the detection of speech via a voice activity detector (VAD). In the case of visual data, this trigger condition can be the detection of some event in the visual data, such as the detection of a user looking at the camera for a threshold period of time. Alternatively, the trigger condition can be an audio trigger like a spoken wake word or the detection of speech (if the visual data is accompanied with audio data). In some embodiments, the trigger condition may be user-specific such that it is tied to particular user(s) (e.g., a wake word or speech spoken by a user U1, the detection of the face a user U2, etc.).

With this activation mechanism in place, PII sanitizing module 202 can run in a low-power mode for the majority of the time in which module 202 simply listens/looks for the trigger condition in the stream of data received from A/V capture module 104. Upon detecting the trigger condition, PII sanitizing module 202 can transition to a higher power mode in order to carry out its sanitization processing.

Further, in certain embodiments PII sanitization module 202 may be designed to block A/V capture module 104 from performing general audio or video recording (or block audio/visual data captured by module 104 from being forwarded to other portions of computing device 102 or off-device) until the trigger condition is detected. This ensures that audio/video data comprising PII cannot be surreptitiously captured by A/V capture module 104 and distributed elsewhere without the device user's consent or knowledge. For example, PII sanitization module 202 may look for trigger condition(s) that are initiated by known user(s) of device 102 (rather than by any user) and block A/V capture module 104 until such user-specific trigger conditions are detected. In a particular embodiment, this blocking mechanism can be implemented at a hardware level (via, e.g., one or more hardwired control lines between PII sanitization module 202 and A/V capture module 104 or via the incorporation of portions of PII sanitization module 202 into the hardware of A/V capture module 104), which means that its operation cannot be modified or overridden in software.

6. Multi-stage Sanitization

While the foregoing sections generally describe PII sanitization module 202 as a singular entity, it is also possible split the functionality of PII sanitization module 202 into two or more sub-modules where each sub-module is responsible for a separate stage of processing (i.e., pre-processing and/or sanitization) on incoming audio/visual data. These sub-modules can be understood as forming a multi-stage PII sanitization pipeline where each sub-module performs its assigned processing steps on a data sample received from a prior sub-module/stage and forwards that (partially) sanitized data sample onwards to the next sub-module/stage. The first sub-module in the pipeline will receive as input the original audio/video data captured via A/V capture module 104 and the last sub-module in the pipeline will forward its output (which represents final sanitized data that has been processed via all pipelines stages) to ML endpoint 108.

For example, in one set of embodiments (depicted in environment 600 of FIG. 6), PII sanitization module 202 can be divided into a first PII sanitization sub-module 602 residing on computing device 102 and a second PII sanitization sub-module 604 residing on a front-end cloud server 606 between computing device 102 and cloud server 106. Each sub-module 602/604 runs within a secure execution environment 608/610 that cannot be tampered with by attackers and does not have any long-term storage capabilities. In addition, all communications between first PII sanitization sub-module 602 and second PII sanitization sub-module 604 are sent over a secure communication channel 612. These measures ensure that PII cannot be leaked or compromised within the pipeline.

According to another set of embodiments (depicted in environment 700 of FIG. 7), PII sanitization module 202 can be divided into first and second PII sanitization sub-modules 702 and 704 that both reside on computing device 102. For instance, first PII sanitization sub-module 702 may be implemented in a dedicated hardware circuit/chip of computing device 102 and second PII sanitization sub-module 704 may be implemented in software that runs on a general-purpose processor of computing device 102. As with the pipeline shown in FIG. 6, each sub-module 702/704 runs within a secure execution environment 706/708 and passes data to each other over a secure communication channel 710.

According to yet another set of embodiments, (depicted in environment 800 of FIG. 8), PII sanitization module 202 can be split into a first PII sanitization sub-module 802 residing on computing device 102 and a second PII sanitization sub-module 804 residing on another computing device 806 owned by the same user. For example, computing device 102 may be a smart assistant device owned by a user U and computing device 806 may be a personal computer also owned by U. As with the pipelines shown in FIGS. 6 and 7, each sub-module 802/804 runs within a secure execution environment 808/810 and passes data to each other over a secure communication channel 812.

Figure 6:
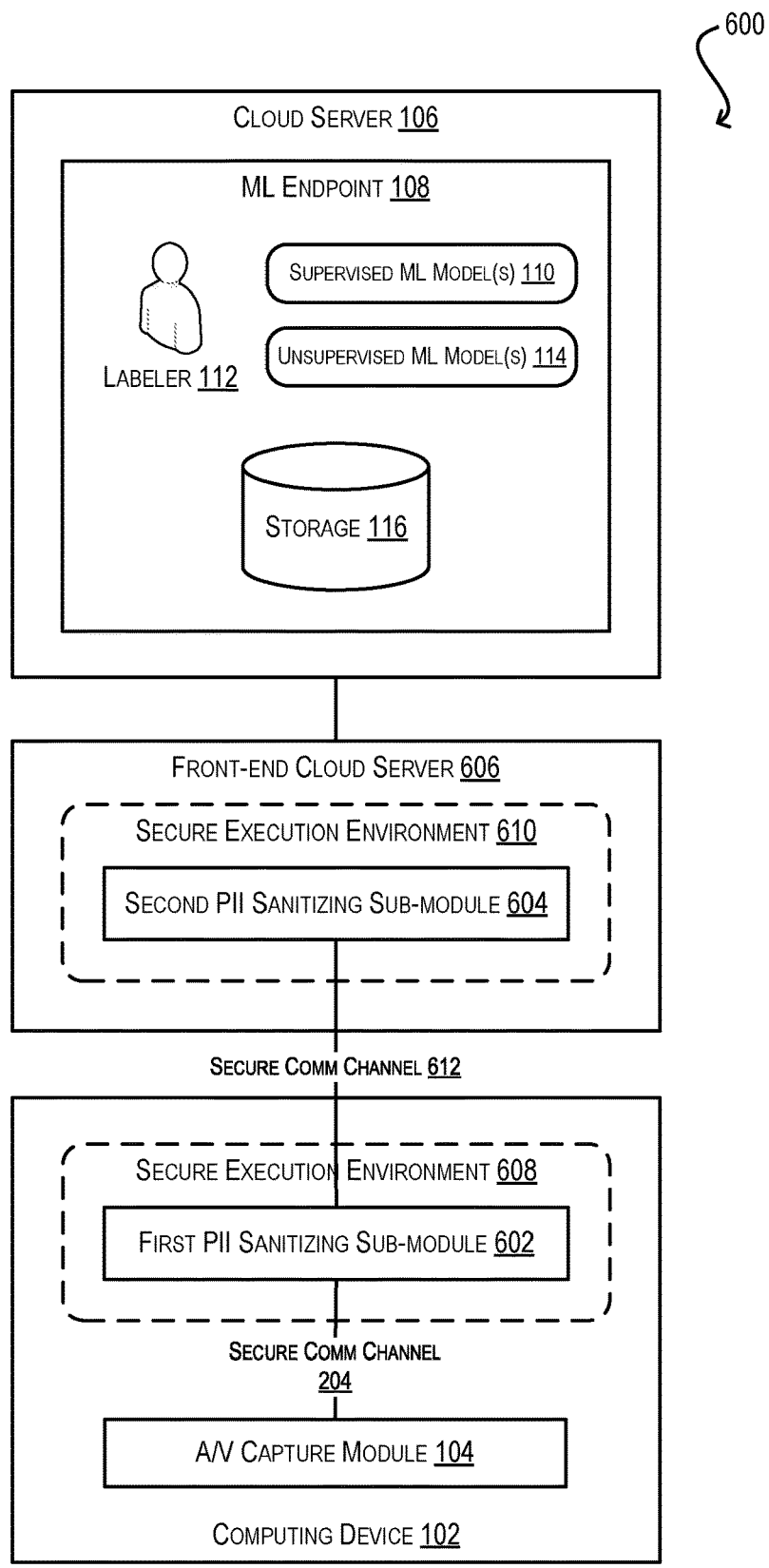
FIGS. 6, 7, and 8 depict a number of multi-stage PII sanitization pipeline configurations according to certain embodiments.
Figure 7:
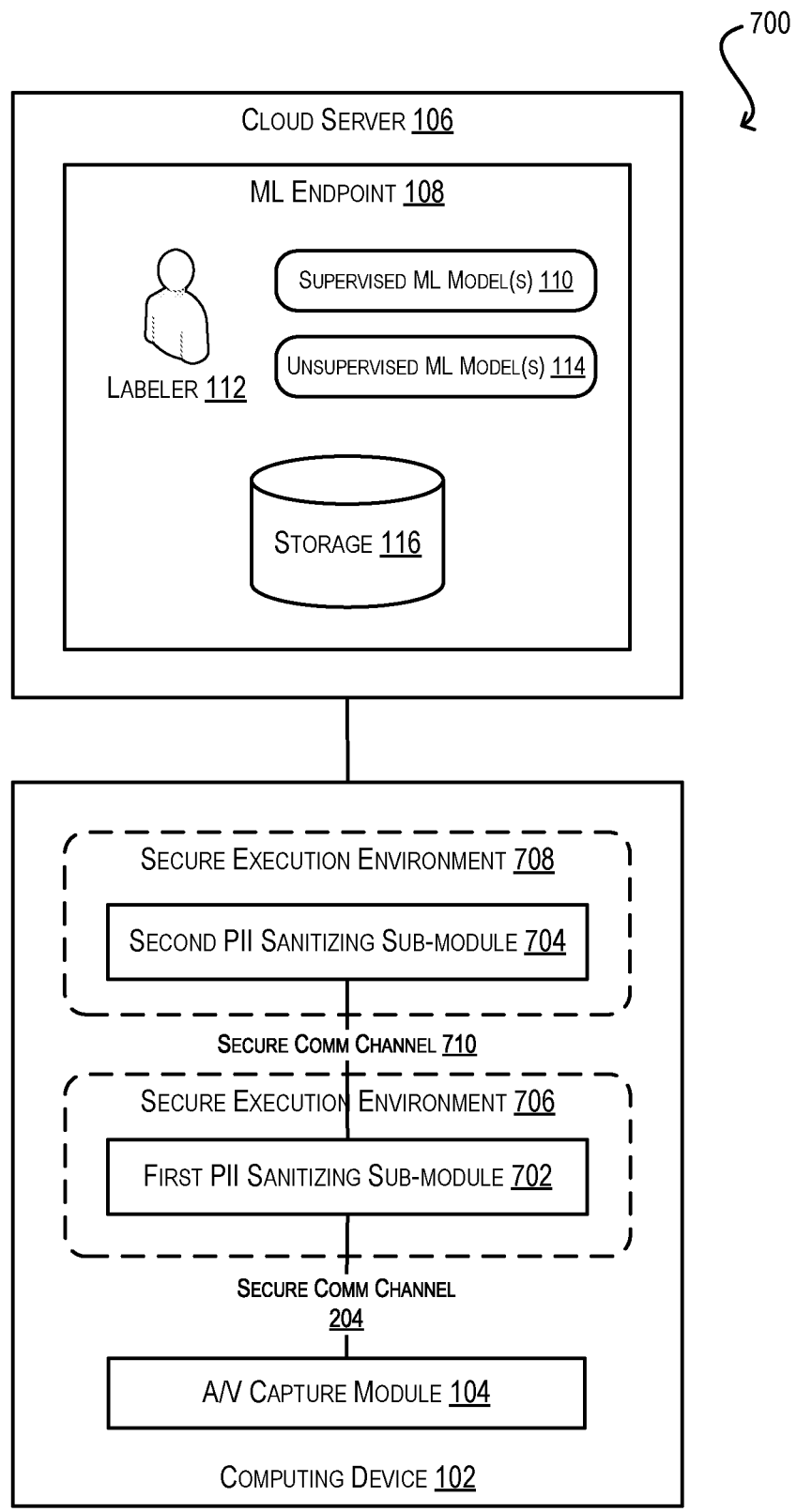
Figure 8:
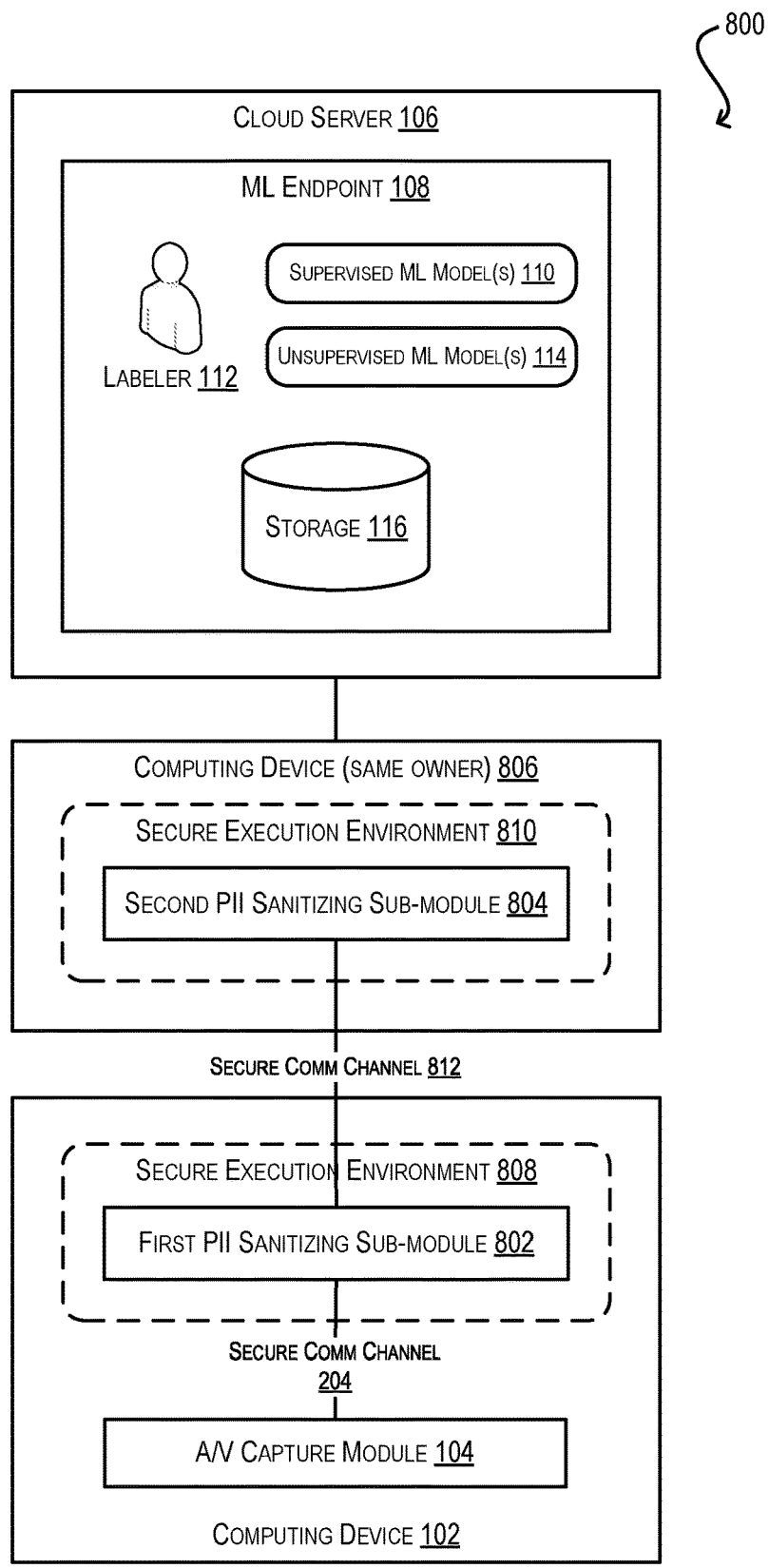

And according to yet further embodiments, various permutations and combinations of the pipelines shown in FIGS. 6, 7, and 8 are possible (e.g., there may be first and second sub-modules on computing device 102, a third sub-module on computing device 806, and a fourth sub-module on front-end cloud server 606). One of ordinary skill in the art will recognize other variations, modifications, and alternatives.

Generally speaking, each PII sanitization sub-module in a given multi-stage pipeline configuration can perform any disjoint or overlapping subset of the processing steps attributed to PII sanitizing module 202 in the present disclosure. For instance, if the processing involves steps A, B, and C and module 202 is split into a multi-stage pipeline comprising sub-modules M1 and M2, sub-module M1 may be configured to perform step A and sub-module M2 may be configured to perform steps B and C. Alternatively, sub-module M1 may be configured to perform steps A and C and sub-module M2 may be configured to perform step B. Alternatively, sub-module M1 may be configured to perform steps A and B and sub-module M2 may be configured to perform steps A, B, and C. As can be seen, any permutation of steps A, B, and C across sub-modules M1 and M2 (including repeating one or more steps on each sub-module) is possible.

That being said, in certain embodiments one or more heuristics may be applied to guide how the processing steps should be distributed across sub-modules. For example, sub-modules that are implemented on machines or components with fewer computing resources and/or a smaller power budget may be assigned processing steps that are less computationally complex, while sub-modules that are implemented on machines or components with greater computing resources and/or a larger power budget may be assigned processing steps that are more computationally complex. Further, sub-modules that are located earlier in the pipeline (or in other words, are closer to A/V capture module 104) may be assigned processing steps that remove more sensitive PII (i.e., PII that is more revealing of a person's identity), while sub-modules that are located later in the pipeline (or in other words, are closer to ML endpoint 108) may be assigned processing steps that remove less sensitive PII (i.e., PII that is less revealing of a person's identity).

These two heuristics ensure that (1) each machine or component participating in the multi-stage pipeline carries out a level of work that is appropriate for its capabilities, and (2) the most sensitive PII is removed as early as possible in the pipeline, which reduces the probability of PII leakage in later pipeline stages (which are further away from the original data source and thus are likely less trusted) and improves the efficiency of those later stages.

For example, assume the multi-stage pipeline is configured to sanitize visual data and is implemented using the pipeline configuration shown in FIG. 6 (i.e., with a first sub-module 602 on computing device 102 and a second sub-module 604 on front-end cloud server 606). Further assume that computing device 102 has a limited power budget (due to being, e.g., a battery-powered device such as a smartphone), while front-end cloud server 606 has a significantly higher or unlimited power budget. In this scenario, first sub-module 602 may apply a relatively simple face detection algorithm/model on the visual data received from A/V capture module 104, blur out the identified faces, and pass this partially sanitized data to second sub-module 604. Second sub-module 604 may then apply a more sophisticated face detection algorithm/model to that partially sanitized data in order to identify and remove any faces that may have been missed by first sub-module 602, as well as apply additional algorithms/models to identify and remove other, less sensitive types of visual PII (e.g., text, background objects such as street signs, etc.).

As another example, assume the multi-stage pipeline is configured to sanitize audio data and is implemented using the pipeline configuration shown in FIG. 7 (i.e., with first and second sub-modules 702 and 704 on computing device 102). Further assume that first sub-module 702 is implemented in hardware using an embedded chip with limited compute and memory resources, while second sub-module 704 is implemented in software that runs on a general-purpose CPU with more processing cores and a relatively large pool of memory. In this scenario, first sub-module 702 may apply a relatively simple speech feature extraction algorithm/model on the audio data received from A/V capture module 104 and pass the extracted speech features to second sub-module 704. Second sub-module 704 may then apply additional, more complex algorithms/models to those speech features to remove further PII, such as by remapping the speech features to those of a generic speaker, identifying and removing speech features that may correspond to spoken PII, and so on.

7. Ultra-low Power Hardware Implementation

As mentioned previously, in certain embodiments the functionality of PII sanitization module 202 (or a sub-module/stage thereof) can be realized as a dedicated, ultra-lower power hardware circuit (e.g., ASIC or FPGA) within computing device 102 that includes logic blocks implementing the various pre-processing and/or sanitization steps assigned to the circuit. An "ultra-low power" circuit is one that consumes power on the order of microwatts or less during its normal operation. This allows for the PII sanitization techniques of the present disclosure to be incorporated into power constrained computing devices such as small form factor, battery-powered devices.

To use as little power as possible, this ultra-low power hardware circuit can make use of many of the efficiency-oriented features described in prior sections, such as an activation mechanism (e.g., wake word, VAD, etc.) that initiates sanitization processing only upon detection of a trigger condition, data compression, and the offloading of more complex sanitization steps to other devices/sub-modules. In a particular embodiment, this circuit may be integrated into the silicon of A/V capture module 104, which enables the chip to easily control the operation of module 104 (e.g., turn on and off audio/video recording) at the hardware level in accordance detection or non-detection of the trigger condition.

8. Example Computing Device Architecture

Figure 9:
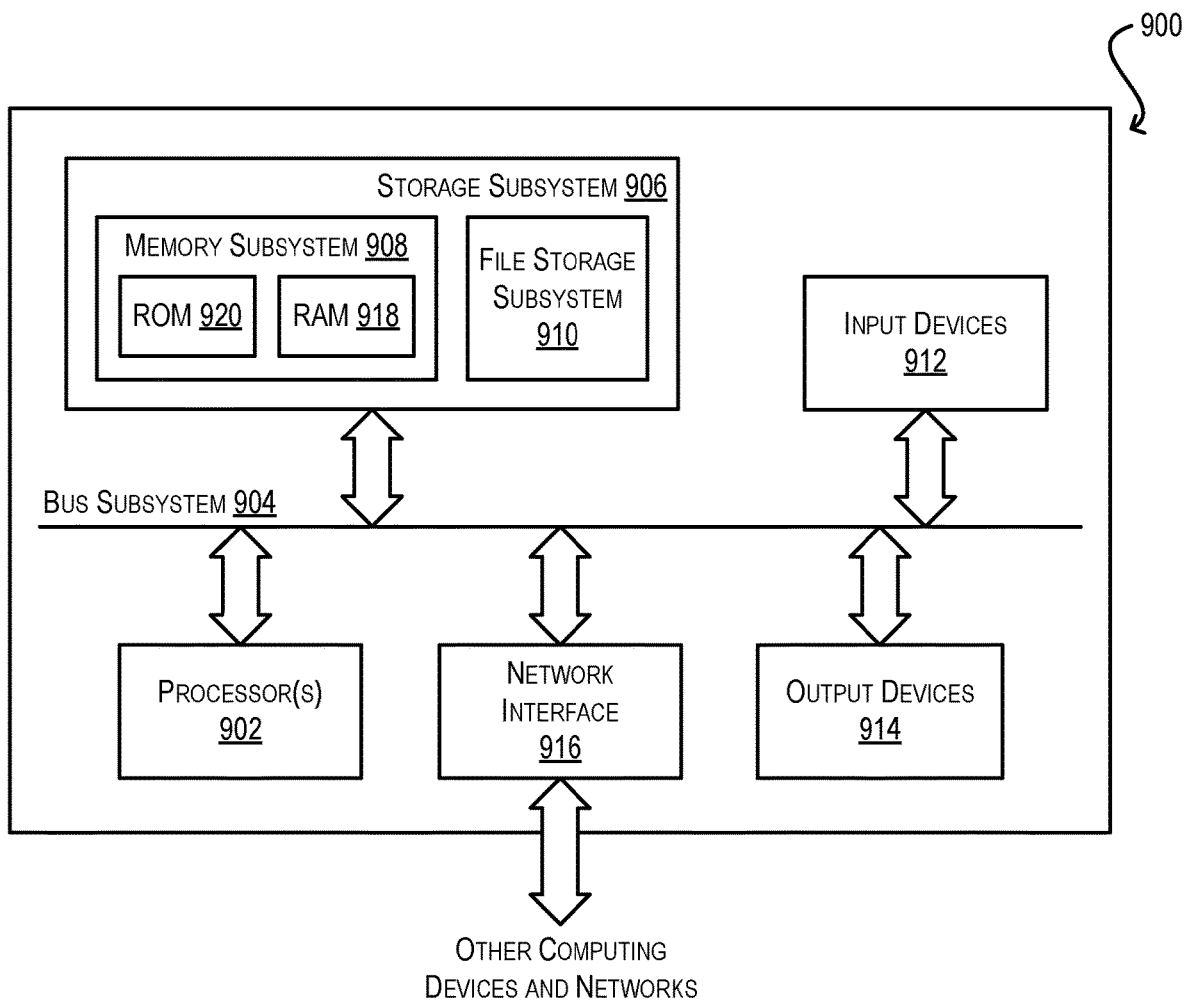
FIG. 9 depicts an example computing device according to certain embodiments.

FIG. 9 is a simplified block diagram of the architecture of an example computing device 900 according to certain embodiments. This general architecture may be employed by computing device 102 of FIG. 1 and/or any other devices or systems described in the foregoing sections. As shown, computing device 900 includes one or more processors 902 that communicate with a number of peripheral devices via a bus subsystem 904. These peripheral devices include a storage subsystem 906 (comprising a memory subsystem 908 and a file storage subsystem 910), input devices 912, output devices 914, and a network interface subsystem 916.

Bus subsystem 904 can provide a mechanism for letting the various components and subsystems of computing device 900 communicate with each other as intended. Although bus subsystem 904 is shown schematically as a single bus, alternative embodiments of the bus subsystem can utilize multiple buses.

Network interface subsystem 916 can serve as an interface for communicating data between computing device 900 and other computing devices or networks. Embodiments of network interface subsystem 916 can include wired (e.g., coaxial, twisted pair, or fiber optic Ethernet) and/or wireless (e.g., Wi-Fi, cellular, Bluetooth, etc.) interfaces.

Input devices 912 can include a camera, a touch-screen incorporated into a display, a keyboard, a pointing device (e.g., mouse, touchpad, etc.), a microphone, and/or other types of input devices. In general, use of the term "input device" is intended to include all possible types of devices and mechanisms for inputting information into computing device 900.

Output devices 914 can include a display subsystem (e.g., a flat-panel display), an audio output device, and/or the like. In general, use of the term "output device" is intended to include all possible types of devices and mechanisms for outputting information from computing device 900.

Storage subsystem 906 includes a memory subsystem 908 and a file/disk storage subsystem 910. Subsystems 908 and 910 represent non-transitory computer-readable storage media that can store program code and/or data that provide the functionality of various embodiments described herein.

Memory subsystem 908 can include a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 900 is illustrative and not intended to limit embodiments of the present disclosure. Many other configurations having more or fewer components than computing device 900 are possible.

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the disclosure as set forth in the following claims.

What is claimed is:

1. A method comprising:
receiving, at a first module of a computing device, an audio or visual (A/V) data sample from an A/V capture module, wherein the first module executes within a first secure execution environment of the computing device, and wherein the A/V data sample is received from the A/V capture module via a first secure communication channel;
pre-processing, by the first module, the A/V data sample to detect speech or appearance of one or more people in the A/V data sample, the pre-processing being performed while the first module operates in a lower power mode; and
in response to detecting the speech or appearance of one or more people in the A/V data sample:
transitioning, by the first module, from the lower power mode to a higher power mode; and
sanitizing, by the first module, the A/V data sample while operating in the higher power mode, wherein the sanitizing includes identifying personally identifiable information (PII) in the A/V data sample and removing, obfuscating, and/or transforming the identified PII, wherein the sanitizing results in a sanitized version of the A/V data sample, wherein the sanitizing is performed only in response to detecting the speech or appearance of one or more people in the A/V data sample, and wherein the first module blocks, via a hardware mechanism, other portions of the computing device from accessing audio or visual data captured by the A/V capture module until the speech or appearance of one or more people in the A/V data sample is detected.

2. The method of claim 1 further comprising:
forwarding, by the first module, the sanitized version of the A/V data sample to a machine learning (ML) endpoint for performing training or inference with respect to one or more ML models.

3. The method of claim 2 wherein the ML endpoint is located remotely from the first module.

4. The method of claim 1 wherein the pre-processing further comprises removing noise and echoes from the A/V data sample.

5. The method of claim 1 wherein the pre-processing further comprises compressing the A/V data sample.

6. The method of claim 1 wherein the A/V data sample is captured using a plurality of microphones and wherein the pre-processing further comprises applying beamforming techniques.

7. The method of claim 1 wherein the speech or appearance of one or more people pertains to a specific person.

8. The method of claim 1 wherein the first module is part of a plurality of modules that act in concert to sanitize PII from audio or visual data captured by the A/V capture module.

9. The method of claim 8 wherein the plurality of modules include at least a second module, and wherein the first module forwards the sanitized version of the A/V data sample to the second module via a second secure communication channel.

10. The method of claim 9 wherein the second module performs further sanitizing of the sanitized version of the A/V data sample.

11. The method of claim 9 wherein the second module executes within a second secure execution environment residing on a front-end cloud server.

12. The method of claim 9 wherein the second module executes within a second secure execution environment residing on the computing device.

13. The method of claim 10 wherein the sanitizing performed by the first module is less complex than the further sanitizing performed by the second module.

14. The method of claim 10 wherein the sanitizing performed by the first module is configured to remove more sensitive PII than the further sanitizing performed by the second module.

15. The method of claim 1 wherein the A/V data sample includes speech content and wherein the sanitizing comprises:
  identifying portions of the speech content that may be considered PII;
  generating a warning for a user of the computing device indicating the identified portions; and
  receiving a decision from the user on whether to sanitize the portions in the A/V data sample.

16. The method of claim 1 wherein the first module is implemented as an ultra-low power hardware circuit.

17. A non-transitory computer readable medium having stored thereon program code executable by a module of a computing device, wherein the module executes within a secure execution environment of the computing device, and wherein the program code embodies a method comprising:
  receiving an audio or visual (A/V) data sample from an A/V capture module via a secure communication channel;
  pre-processing the A/V data sample to detect speech or appearance of one or more people in the A/V data sample, the pre-processing being performed while the module operates in a lower power mode; and
  in response to detecting the speech or appearance of one or more people in the A/V data sample:
    transitioning from the lower power mode to a higher power mode; and
    sanitizing the A/V data sample while operating in the higher power mode, wherein the sanitizing includes identifying personally identifiable information (PII) in the A/V data sample and removing, obfuscating, and/or transforming the identified PII, wherein the sanitizing results in a sanitized version of the A/V data sample, wherein the sanitizing is performed only in response to detecting the speech or appearance of one or more people in the A/V data sample, and wherein the module blocks, via a hardware mechanism, other portions of the computing device from accessing audio or visual data captured by the A/V capture module until the speech or appearance of one or more people in the A/V data sample is detected.

18. A hardware circuit comprising:
a first set of logic blocks configured to receive an audio or visual (A/V) data sample from an A/V capture module via a secure communication channel;
a second set of logic blocks configured to pre-process the A/V data sample to detect speech or appearance of one or more people in the A/V data sample, the pre-processing being performed while the hardware circuit operates in a lower power mode; and
a third set of logic blocks configured to:
  in response to detecting the speech or appearance of one or more people in the A/V data sample:
    transition the hardware circuit from the lower power mode to a higher power mode; and
    sanitize the A/V data sample while operating in the higher power mode, wherein the sanitizing includes identifying personally identifiable information (PII) in the A/V data sample and removing, obfuscating, and/or transforming the identified PII, wherein the sanitizing results in a sanitized version of the A/V data sample, wherein the sanitizing is performed only in response to detecting the speech or appearance of one or more people in the A/V data sample, and wherein other portions of the computing device are blocked, via a hardware mechanism, from accessing audio or visual data captured by the A/V capture module until the speech or appearance of one or more people in the A/V data sample is detected.

* * * * *